Jan. 15, 1963
R. W. DINNING ET AL
3,073,392
WELL APPARATUS
Filed March 8, 1960
3 Sheets-Sheet 1
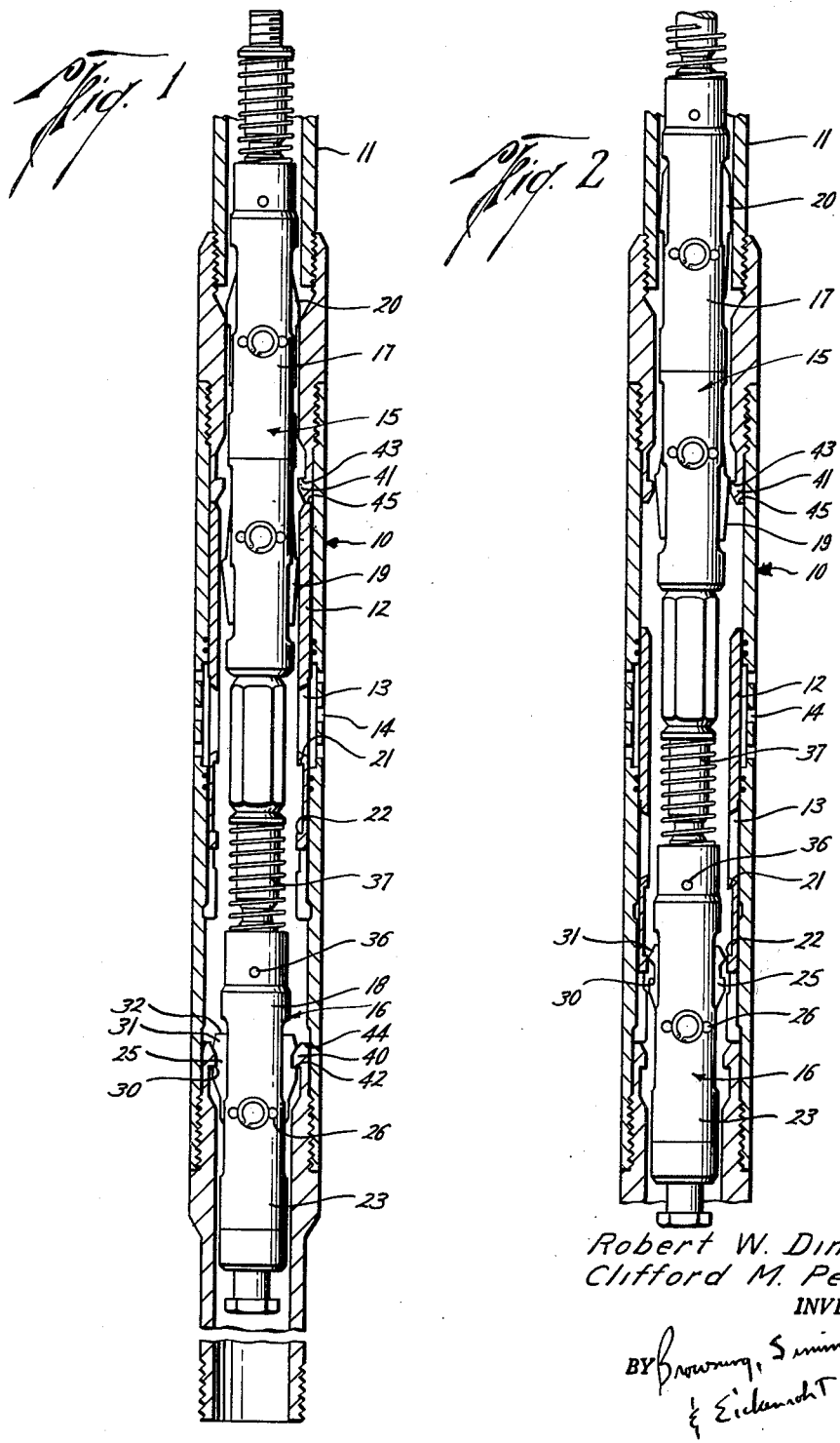
Robert W. Dinning
Clifford M. Peters
INVENTORS
BY Browning, Simms, Hyer
& Eickenroht
ATTORNEYS

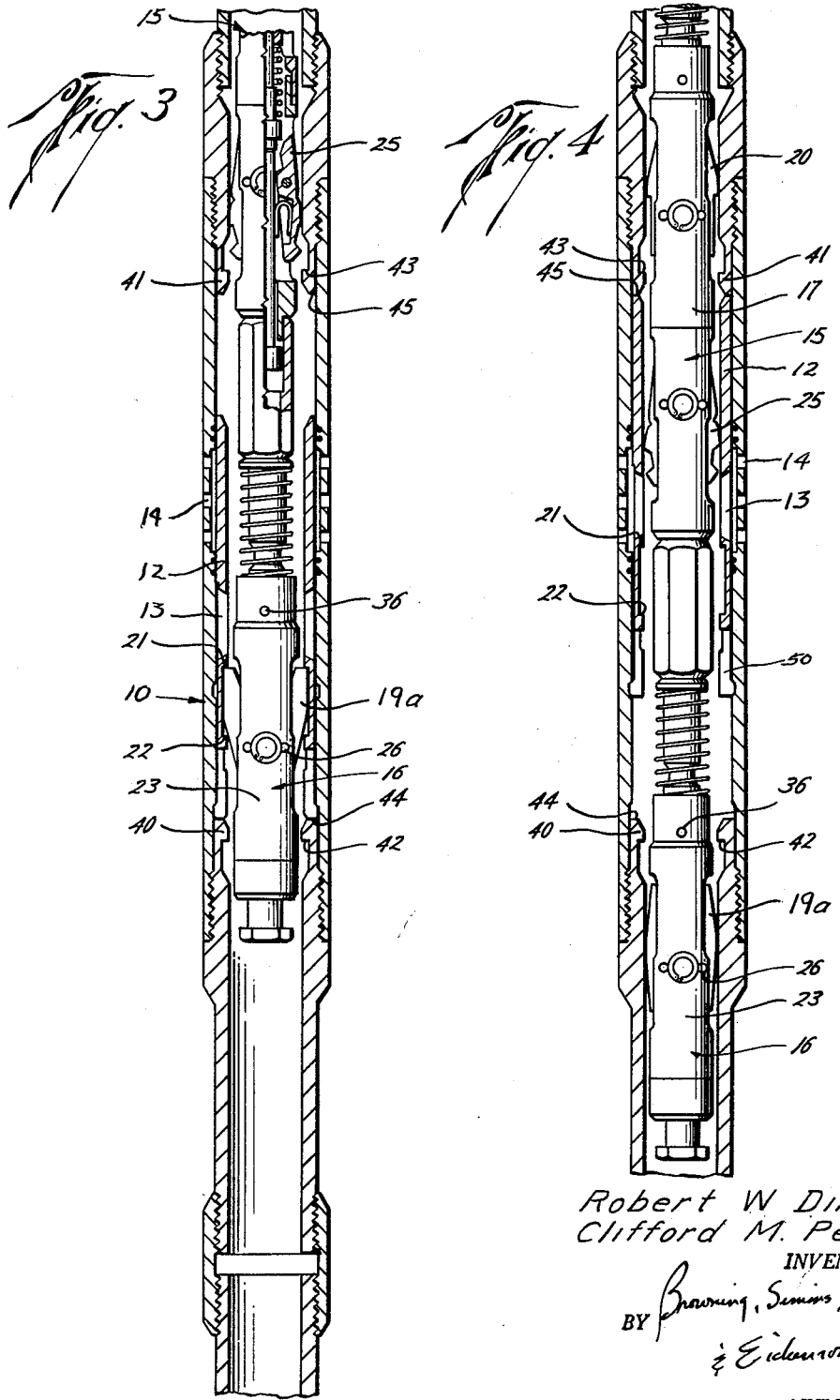

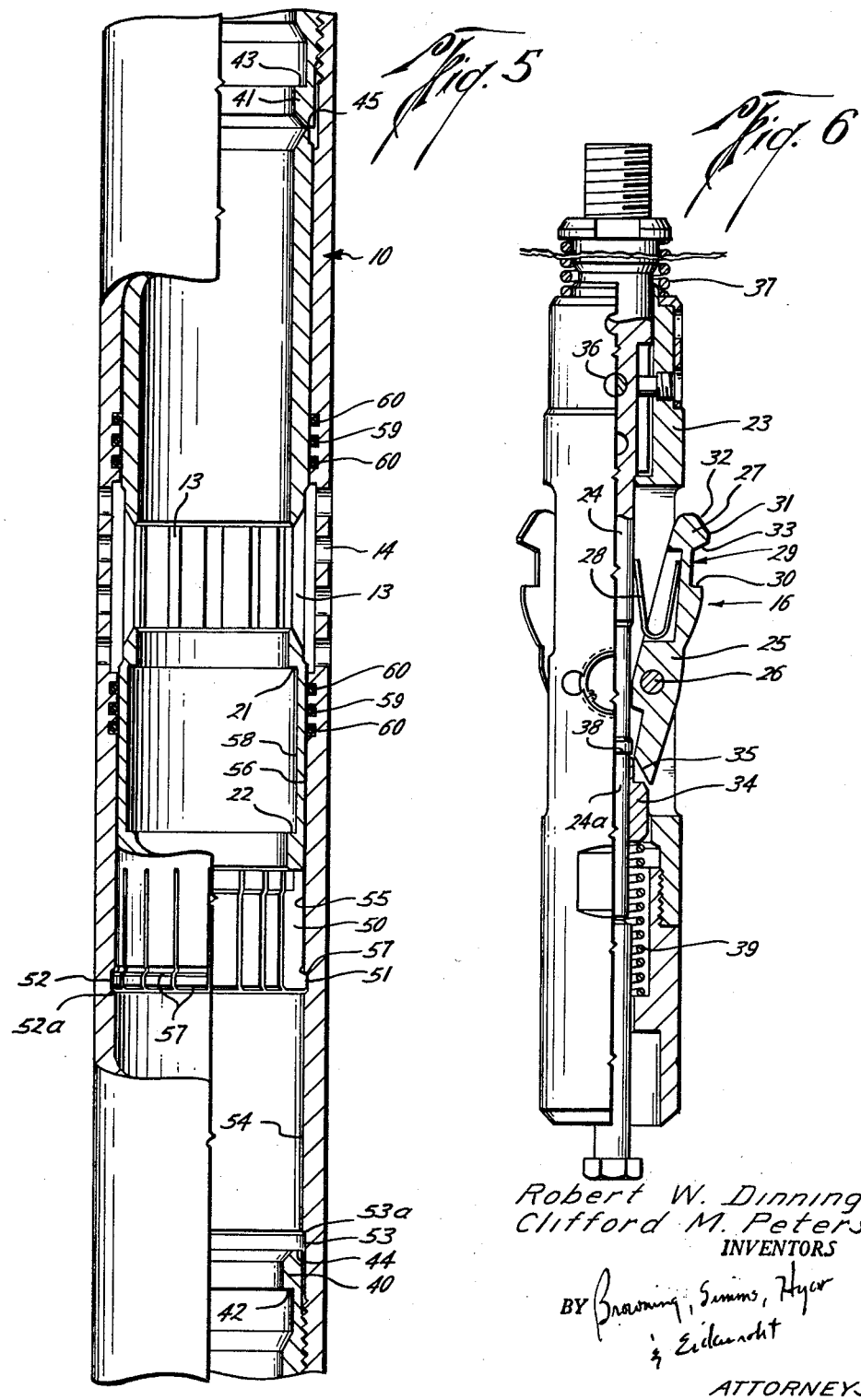

United States Patent Office 3,073,392
Patented Jan. 15, 1963

3,073,392
WELL APPARATUS
Robert W. Dinning and Clifford M. Peters, Longview, Tex., assignors to U.S. Industries, Inc., a corporation of Delaware
Filed Mar. 8, 1960, Ser. No. 13,637
18 Claims. (Cl. 166—224)

This invention relates to an improved well apparatus wherein a valve means or other member is shifted from one position to another by manipulation of a mechanism in a well, the construction being such that there is a positive indication of whether or not the valve means or other member has been completely shifted to a desired position. In another of its aspects, it relates to an improved locator tool for indicating whether or not a valve means or other member has been completely shifted to a desired position. In still another aspect, it relates to an improved sleeve-type valve adapted particularly for use in conducting well operations.

Sleeve-type equipment has been widely used in oil wells for various purposes. In this equipment, a sleeve is usually disposed inside a conduit to be shifted axially between two or more positions. For example, sleeve valves have been widely used to control flow between the interior and exterior of a tubing. Thus, a port through the wall of the tubing may be opened by shifting the sleeve upwardly and closed by shifting the sleeve downwardly or vice versa. Sleeve equipment of the above general type is disclosed in U.S. Patents 2,804,830, 2,790,501, 2,790,-395, 2,818,925 and 2,808,781, and in U.S. application Serial No. 484,164, filed January 26, 1955. It is to this general type of sleeve equipment that this invention pertains.

Since such general type of equipment includes a shiftable sleeve or other member, a tool must be provided to so shift the sleeve. Ordinarily, this shifting is done by wire-line although other means can be used, such as sucker rods, etc. The shifting tool usually includes dogs which can engage the sleeve to shift it upwardly and downwardly. Jars are ordinarly used in conjunction with the shifting tool in order to apply a considerable force to shift the sleeve. It has been found that when a sleeve is to be shifted downwardly, the wire-line operator will not infrequently continue jarring down on the sleeve after it has been completely shifted. This excessive jarring can and does damage the shifting dogs as well as the sleeve. Even then, the operator may not be sure that the sleeve has been fully shifted.

The same lack of positive assurance of complete shifting exists when the sleeve is to be shifted upwardly although perhaps not to the same degree as is the case for downward shifting. The wire-line shifting tools are usually constructed so that the upshifting dogs are retracted from engagement with the sleeve upon a predetermined upward pull being exerted on the wire-line. In designing the tools, the upward pull necessary to retract the dogs is made greater than that required to shift the sleeve upwardly. Hence there is some assurance that if enough force has been applied to retract the dogs, the sleeve has been shifted. Nevertheless, there may be a few instances in which the sleeve has become stuck in its down position or, for one reason or another, requires a greater than ordinary upward pull to shift. In these instances, it might be possible for the wire-line operator to believe he has shifted the sleeve whereas he has not. Here again, operators have been found to continue jarring on the sleeve long after it has been shifted thereby causing damage.

In application Serial No. 508,562, filed May 16, 1955, now U.S. Patent 2,924,278, there is shown and described a locator tool for indicating when a sleeve or other shiftable member has been fully shifted to a desired position. While this tool usually performs its desired function in the hands of experienced wire-line personnel, there have been instances in which inexperienced personnel improperly used it so as to not gain the full advantage of it and it is an object of this invention to provide improvements in well apparatus of the above nature, and particularly to provide an improved locator apparatus, so as to overcome certain disadvantages incidental to the prior apparatus.

Another object of this invention is to provide a well apparatus wherein a member to be shifted in a well conduit is engaged by a shifting tool to accomplish such shifting and wherein a locator arrangement is provided to indicate in a simple and yet positive manner whether or not the shifting has been completed.

Another object is to provide such an apparatus in which incomplete shifting is indicated by limiting the movement of the shifting tool in a direction opposite to that in which the sleeve is being shifted and in which complete shifting of the member is indicated by unlimited movement of the tool in such opposite direction. For example, if the member is being shifted upwardly, the shifting tool can be moved downwardly only a limited distance until the member has been completely shifted upwardly after which the shifting tool can freely move downwardly.

Another object of this invention is to provide a well apparatus wherein a member to be shifted can have blows delivered to it by a shifting tool and wherein whether or not the shifting has been completed can be readily determined between each blow without any special manipulation of the tool.

Another object of this invention is to provide such an apparatus in which a locator apparatus not only indicates whether or not a sleeve or other shiftable member has been completely shifted but also permits a more effective use of jars in jarring the member upwardly in that the locator tool limits downward movement of the tool, thereby permitting the jars to be actuated without the tool dropping each time the wire-line is slackened to begin a jarring stroke.

Another object of the invention is to provide an improved sleeve-type valve particularly adapted to be used in a well and one in which the force required to shift the sleeve from one position to another remains substantially constant over long periods of operation.

Another object of the invention is to provide such a valve which is not susceptible of becoming stuck by virtue of sand or other debris being deposited in its mechanism.

Other objects, advantages and features of this invention will be apparent to one skilled in the art upon a consideration of the written specification, the appended claims and the attached drawings wherein:

FIG. 1 illustrates a preferred embodiment of the apparatus of this invention and shows a sleeve-type valve in one position with a shifting-locator tool positioned to begin shifting the sleeve downwardly to closed position;

FIG. 2 is a view similar to FIG. 1 but shows the arrangement after the sleeve has been fully shifted downwardly;

FIG. 3 and FIG. 4 are similar to FIGS. 1 and 2 except that they respectively show the arrangement of parts for shifting the sleeve upwardly at the beginning and end of the operation, respectively;

FIG. 5 is a view, partially in elevation and partially in section, illustrating an improved sleeve valve; and FIG. 6 is a half-section, half-elevation view of a tool attachment made in accordance with this invention for use in conjunction with existing shifting tools.

Like characters of reference are used throughout the several views to designate like parts.

Referring now to the drawings, there is shown a conduit 10 adapted to be disposed in a well, as for example by attachment to tubing 11 and having a sleeve or other member which is to be shifted axially in the conduit from one position to another. In the particular illustration, the improved sleeve valve is shown and it includes a sleeve 12 shiftable between upper and lower positions to move slots 13 in the sleeve into and out of register with ports 14 in the conduit thereby controlling fluid communication between the interior and exterior of the conduit.

In accordance with this invention, a tool is provided for shifting a shiftable member and for indicating when the member has been shifted to one of its positions. For convenience of description of the illustrated tool, it can be divided into upper and lower portions 15 and 16. The construction of the upper portion 15 as shown in FIG. 1 is fully shown and described in application Serial No. 508,562, filed May 16, 1955 and now U.S. Patent 2,924,278 and reference is made to the application for a detailed description (particularly FIGS. 1A and 1B of the application). However, a general description of this portion of the tool will be given in order to more fully explain how it coacts with the bottom portion 16. The shifting tool has a body portion 17 which, together with body portion 18 of the lower portion of the tool, comprises the bdy of the tool. This body carries a means for releasably engaging the sleeve 12 or other shiftable member to shift the same toward one of its positions when the body is moved in that direction. In the illustrated form, such means can comprise a set of downshifting dogs 19 and a set of retracting dogs 20. Each of these sets of dogs is biased outwardly and is movable between extended and retracted positions. The arrangement is such that one set of dogs is urged toward extended position while the other set is held in retracted position. Thus as the tool is being run into the hole, the retracting dogs 20 are free to move to extended position while the downshifting dogs 19 are held retracted.

When it is desired to shift a sleeve or other member upwardly, the tool is lowered into the well conduit until upshifting dogs 19a are at least slightly below an abutment or shoulder, such as at 21, and then the tool is raised so that the upshifting dogs move outwardly to engage their upper ends with shoulder 21. Then by pulling on the wire-line or by jarring upwardly, the sleeve or other member is moved to its upper position. Then by pulling upwardly on the wire-line with a force greater than that calculated to shift the sleeve, a releasable connection, such as a shear pin, is disengaged, causing the mechanism to retract the upshifting dogs 19a so that the tool can be removed from the hole.

On the other hand, when it is desired to shift the sleeve downwardly, the tool is again lowered into the hole and dogs 20 are engaged with shoulder 21 or other abutment in the conduit and sufficient strain taken on the wire-line to release the releasable connection, causing dogs 20 to retract and dogs 19 to be freed for movement toward extended position. Then the tool is moved upwardly so that the downshifting dogs 19 can move out and engage shoulder 22, after which the tool can be jarred downwardly to shift the sleeve downwardly.

Turing now to a detailed description of the lower portion 16 of the tool, this portion can be termed a locator tool attachment. Its specific construction is illustrated in more detail in FIG. 6. In this view, the construction includes body parts 23 and 24 connected together for movement axially relative to each other. The outer part 23 carries a locator dog or member 25 pivoted thereto by pin 26 so that upper end 27 can move between extended (as shown) and retracted position and is urged to extended position by a spring 28 or other resilient means. The movable end of the dog has notch 29 cut in its outer face and this notch provides a shoulder 30 for engagement with a locator shoulder on the conduit to limit movement of the shifting tool when the sleeve has not been completely shifted as will be more fully described below. Shoulder 30 is disposed so that preferably it is perpendicular to the longitudinal axis of the tool when the dog is in extended position.

The dog also has a cam part 31 which is engageable with a sleeve or other shiftable member when the latter has been completely shifted to thereby prevent the shoulder 30 of the dog from engaging with the locator shoulder on the conduit so that the tool can move freely therethrough.

For reasons which will become more apparent below, it is sometimes desired to retract the dog carried by the tool of FIG. 6 after it has performed its function. With the locator dog of FIG. 6, this retraction is not necessary to lower the tool and usually is not necessary for withdrawing the tool from the hole because the dog will not catch on any recess, etc. in the conduit. Thus cam part 31 has sloping surfaces 32 and 33 permitting the dog to be moved in either direction and upon encountering a tubing joint or the like, the cam parts prevent the shoulder 30 on the dogs from catching on the joint. However, if desired, the locator dog or other dog placed in the tool of FIG. 6 can be retracted. For this purpose, the inner body part carries an abutment 34 which when moved upwardly relative to the dog, contacts a part 35 on the dog to move the lower end outwardly and hence the upper end inwardly. Normally, upward movement of the inner body part is prevented by a shear pin 36 or other releasable means. However, when it is desired to retract the dog, it is engaged with the tubing and a strain taken on the inner body part by the wire-line sufficient to shear pin 36 which permits the inner body part to move upwardly. It is retained in its upper position by spring 37.

When the upward strain is taken on the inner body part to shear pin 36, the dogs carried by the tool will be engaged with an abutment. To avoid having to retract the dogs as the pin is being sheared, abutment 34 can be in the form of a ring (as shown) carried on a shaft portion 24a of the inner body part and urged toward a shoulder 38 thereon by spring 39. This permits the pin to be sheared without moving the dogs but after shearing, the wire-line can be slacked off permitting spring 39 to move abutment 34 upwardly to retract the dogs.

Returning now to FIG. 1, the conduit is provided with latch parts adapted to be engaged by the locator dog to prevent movement of the tool through the conduit in one direction until the sleeve or other shiftable member has been completely shifted. In the illustrated form, these latch parts are shown as annular locator rings 40 and 41, providing shoulders 42 and 43 to be engaged by the shoulder 30 of the locator dogs. The locator rings are carried by the conduits, each preferably adjacent to the shiftable member when it is in its fully shifted position. Therefore, the ends of the locator rings 44 and 45 can act as stops for the sleeve or shiftable member. The arrangement is such that with shoulder 30 engaged with shoulder 42 (or 43 as explained below), the cam part 31 of the locator dogs is in a position to be engaged by the sleeve when it has been completely shifted to thereby prevent the locator dogs from engaging their shoulders with the shoulder on the locator ring. This permits the tool to move past the locator ring.

Turning now to a description of the operation of the illustrated embodiment, let it be assumed that a sleeve 12 is in its up position and is to be shifted downwardly as shown in FIG. 1. The tool is lowered into the conduit 11 by wire-line with retracting dogs 20 released for outward movement and downshifting dogs 19 held in retracted position. The tool is lowered until the retracting dogs 20 are below shoulder 21 and then the tool is raised to engage these dogs with either shoulder 21 or other abutment. This causes dogs 20 to be retracted and dogs 19 to be released. The tool is then maneuvered until dogs 19 engage shoulder 22 after which the sleeve can be jarred to its down position. Until the sleeve reaches this down position, the tool can be pulled upwardly until the locator dogs 25 reach locator ring 40 at which point they will be moved outwardly to engage their shoulders 30 with shoulder 42 thereby preventing any further upward movement of the tool. This signals to the operator that the sleeve has not been fully shifted. Thereafter, he can continue jarring downwardly on the sleeve. When the sleeve reaches its full down position, as shown in FIG. 2 upward movement of the tool causes cam parts 31 of the locator dogs to engage the sleeve thereby preventing the locator dogs from moving out to latch with the conduit. This signals to the operator that the sleeve has been fully shifted.

To shift a sleeve or other member upwardly, the same arrangement is used except that the upshifting dogs 19a are situated in the lower part of the tool and the locator dogs in the upper part of the tool. The illustrated construction has the advantage that the same basic tool can be used for both shifting operations simply by changing the position of two sets of dogs.

Thus by pulling their respective pivot pins, the downshifting dogs 19 and the locator dogs 25 as shown in FIG. 1 are removed and interchanged. The downshifting dogs are turned over and installed facing upwardly in the lower portion 16 of the tool as shown in FIG. 3 The locator dogs are also turned over and installed facing downwardly as shown in FIG. 3. The tool can then be run in the hole with the upshifting dogs 19a and the locator dogs 25 free to move to extended position. These dogs will merely ride the sides of the conduit until the sleeve to be shifted is reached. If desired, the upper part of the tool can be lowered with the locator dogs 25 held in retracted position and the retracting dogs 20 in the upper part free to move outwardly. This may be necessary where the conduit has some particular joints where the locator dogs might catch or where the tool must be lowered through one sleeve valve to reach another. In this event, the tool is lowered until the dogs 20 are below shoulder 21 and then an upward strain is taken on the tool. This causes dogs 20 to be retracted and locator dogs 25 to be released. The tool can then be pulled upwardly until upshifting dogs 19a engage shoulder 21 and the sleeve moved upwardly either by a continuous pull or by upward jarring. In the latter event, when the jars are slacked off, the shifting tool can move downwardly only until the locator dogs engage shoulder 43. This permits the jars to be actuated without the shifting tool dropping a distance equal to the full stroke of the jar each time the wire-line is slackened to begin a jarring stroke. As the sleeve is moved upwardly, the operator can slacken off on the wire-line to determine if the locator dogs are engaging shoulder 43 thereby indicating whether or not the sleeve has been completely shifted. When the tool is hung by the locator dogs during each jarring stroke, the completion of shifting will be automatically indicated to the operator because the wire-line will not become slack as it did during the jarring operation.

After the sleeve has been shifted upwardly, a strain is taken on the wire-line sufficient to shear pin 36 which permits abutment 34 to retract dogs 19a in the same manner as described above with reference to FIG. 6 for retraction of dogs 25.

From the above it will be seen that when a sleeve is to be shifted in a downward direction, the locator dogs prevent the tool from moving freely upwardly until the sleeve has been fully shifted. When the sleeve is to be shifted downwardly, the reverse is true. Accordingly, the operator can always be sure that the sleeve has been fully shifted before he removes the tool from the well. This would not necessarily be true if the locator dogs were such that when the sleeve was being shifted downwardly, for example, completion of the shifting would be indicated by free downward movement of the tool. In such case, the operator could never be sure of the sleeve's position because the downshifting dogs might hang up on the sleeve or other shoulder in the conduit to give a false indication that the sleeve had not been fully shifted. Conversely, if the locator dogs were such that the tool could be moved downwardly without engaging the locator dogs until the sleeve had been fully shifted, it would still be possible for the downshifting dogs to hang up on the conduit and give a false indication that the sleeve had been fully shifted. Moreover, in both of these instances, it would be necessary to accurately know the exact position of the tool. In the illustrated embodiment, the exact position of the tool need not be known. Also, since the determination of whether or not the sleeve has been fully shifted is by moving the tool in a direction opposite to that which the sleeve is being shifted, the shifting dogs cannot hang up in the conduit to give a false signal.

While the shifting and locating tool of this invention has been described with reference to a sleeve valve, it is contemplated that it can be used to shift other shiftable members disposed in a conduit. Also, the tool can take other forms as long as the same basic functions described above are achieved.

Referring now to the improved sleeve valve shown in the drawings, and particularly to FIG. 5, a portion of this valve has already been described above. In addition, it should be pointed out than an improved detent means is provided for releasably detaining the sleeve valve in its upper or lower positions. Such detent means is provided by slotting one end of the sleeve, preferably the lower, to provide a plurality of resilient fingers 50. These fingers have protuberances 51 extending laterally outwardly from their ends for engagement with a groove 52 to hold the sleeve in its upper position. A lower groove 53 is also provided to hold the sleeve in its downward position. Actually, with stops 44 and 45 provided as shown, only the lower inwardly sloping shoulder 52a of groove 52 need be provided for limiting downward movement of the sleeve and upper inwardly sloping shoulder 53a of groove 53 need be provided for limiting upward movement of the sleeve. However, the inner bore 54 of conduit 10 is preferably of uniform diameter except for grooves 52 and 53 and the outer surfaces 55 of the spring fingers are preferably of the same diameter as the balance of the sleeve so as to form continuations of the outer surface 56 of the sleeve. With this construction, the outer surface of the fingers will always lie, except during shifting, in close contact with the inner bore of the conduit thereby preventing sand or other accumulations between the surfaces which might interfere with the shifting of the sleeve. In this connection, the protuberances 51 have upper and lower shoulders 57 which have a slope complementary to the slope of shoulders 52a and 53a so as to form a close fit therebetween to prevent the intrusion of sand.

With this construction, the spring like fingers will releasably detain the sleeve in its shifted position. When the sleeve is to be shifted, the fingers will be sprung inwardly through a camming action with the end walls of the grooves in the conduit until they reach the other groove, at which time they will spring outwardly to releasably lock the sleeve in place.

As indicated above, the abutments for engaging the shifting dogs with the sleeve are preferably provided by an annular recess 58 intermediate the ends of the sleeve. This leaves the ends of the sleeve free to coact with the locator dogs.

Seals are provided to either side of ports 14 so that fluid cannot flow between the conduit and sleeve. Preferably, these seals comprise O-rings 59 made of a rubber material and having a pair of rings 60 disposed to either side thereof to protect the rubber ring from well fluids. Rings 60 are preferably made of a material which is highly resistant to well fluid such at Teflon.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the acompanying drawings is to be interpreted as illustrative and not in a limiting sense.

The invention having been described, what is claimed is:

1. In an apparatus including a conduit adapted to be positioned in a well bore, a sleeve-like member in the conduit and shiftable axially therein from one position to another, a latch part fixed on the interior of the conduit; and a tool for shifting said member and for indicating when the member has been shifted to one of said positions including a body, means carried by the body for releasably engaging said member to shift the same toward said one position when the body is moved in the direction of said one position, a locator carried by the body for movement laterally of the body between extended and retracted positions, said locator having a latch part engageable with said conduit latch part when in extended position and being biased toward such position so that as the body is moved through the conduit with the sleeve-like member in other than said one position, the latch parts engage to limit further movement of the body through the conduit in a direction opposite to said one position, said locator also having a cam portion engageable with the sleeve when it is in said one position to prevent movement of the locator to extended position so as to thereby prevent latching engagement of the latch parts whereby said further movement of the body through the conduit in opposite direction is permitted to signal that the sleeve-like member has been shifted.

2. The apparatus of claim 1 wherein said means for releasably engaging the sleeve-like member is a dog urged outwardly of the body for movement to an extended position for engagement with a downwardly facing abutment on the sleeve-like member to shift the latter upwardly upon upward movement of the body and disengageable from the abutment upon downward movement of the body, and wherein said locator is a dog having a notch in its outer face providing a downwardly facing shoulder to engage said conduit latch part and also providing said cam portion to be positioned in the path of upward movement of said sleeve-like member when the latch part and shoulder are engaged so that shifting the sleeve-like member to its upper position causes the cam part to engage the sleeve-like member and prevent the locator dog from engaging the conduit latch part.

3. In an apparatus including a conduit adapted to be positioned in a well, a member in the conduit and shiftable axially from a first to a second position; a tool for so shifting the member and for indicating when the member has been shifted to said second position including a body, means carried by the body releasably engageable with the member to shift the member toward said second position upon movement of the body in one direction, means engageable with the conduit upon movement of the body in an opposite direction to limit movement of the body in such opposite direction when the member is in other than said second position, and means connected to the conduit engageable means and engaging the member when it is in its second position to prevent the conduit engaging means from engaging the conduit whereby the body can move in said opposite direction to indicate the member has been shifted.

4. An apparatus including a conduit adapted to be positioned in a well bore, a sleeve in the conduit and shiftable axially therein between upper and lower positions, a latch part fixed on the interior of the conduit above the sleeve adjacent the upper position thereof; and a tool for shifting said sleeve and for indicating when the sleeve has been shifted to its upper position including a body, a shifting dog carried by the body for engaging a downwardly facing abutment on the sleeve to shift the sleeve upwardly when the body is moved upwardly and disengageable from the abutment when the body moves downwardly, a locator dog carried by the body above the shifting dog and urged outwardly of the body to engage said latch part on downward movement of the body when the sleeve is in a position below said upper position, and a cam part connected to the locator dog and engageable by the sleeve when it is in its upper position to prevent the locator dog from engaging said latch part whereby the body can move downwardly through the sleeve to indicate the sleeve has been shifted to its upper position.

5. The apparatus of claim 4 wherein said latch part is an annular ring situated adjacent the upper end of the sleeve when it is in its upper position and providing an upwardly facing shoulder, said locator dog having a notch therein to receive said annular ring when the locator dog is in latching position, said cam part being provided by a portion of the locator dog below said notch extending to lie in the path of movement of the sleeve so that when the sleeve so that when the sleeve has been shifted to its upper position, the upper end of the sleeve engages the cam part to prevent the locator dog from moving to latching position.

6. The apparatus of claim 5 wherein the abutment on the sleeve engageable by the shifting dog is provided by an internal groove in the sleeve intermediate its ends.

7. The apparatus of claim 6 wherein one end of the sleeve is longitudinally slotted to provide a plurality of resilient fingers, said fingers at their ends having a protuberance extending beyond the outer diameter of the sleeve when the fingers are in an unflexed condition, and grooves in the conduit for receiving said protuberances when the sleeve is in its upper and lower positions.

8. An apparatus including a conduit adapted to be positioned in a well bore, a sleeve in the conduit and shiftable axially therein between upper and lower positions, a latch part fixed on the interior of the conduit below the sleeve adjacent the lower portion thereof; and a tool for shifting said sleeve and for indicating when the sleeve has been shifted to its lower position including a body, a shifting dog carried by the body for engaging an upwardly facing abutment on the sleeve to shift the sleeve downwardly when the body is moved downwardly and disengageable from the abutment when the body moves upwardly, a locator dog carried by the body below the shifting dog and urged outwardly of the body to engage said latch part on upward movement of the body when the sleeve is in a position above said lower position, and a cam part connected to the locator dog and engageable by the sleeve when it is in its lower position to prevent the locator dog from engaging said latch part whereby the body can move upwardly through the sleeve to indicate the sleeve has been shifted to its lower position.

9. The apparatus of claim 8 wherein said latch part is an annular ring situated adjacent the lower end of the sleeve when it is in its lower position and providing a downwardly facing shoulder, said locator dog having a notch therein to receive said annular ring when the locator dog is in latching position, said cam part being provided by a portion of the locator dog above said notch extending to lie in the path of movement of the sleeve so that when the sleeve has been shifted to its lower position, the lower end of the sleeve engages the cam part to prevent the locator dog from moving to latching position.

10. The apparatus of claim 9 wherein the abutment on the sleeve engageable by the shifting dog is provided by an internal groove in the sleeve intermediate its ends.

11. The apparatus of claim 10 wherein one end of the sleeve is longitudinally slotted to provide a plurality of resilient fingers, said fingers at their ends having a protuberance extending beyond the outer diameter of the sleeve when the fingers are in an unflexed condition, and grooves in the conduit for receiving said protuberances when the sleeve is in its upper and lower positions.

12. An apparatus including a conduit adapted to be positioned in a well bore, a sleeve in the conduit and shiftable axially therein between upper and lower positions, said conduit having upwardly and downwardly facing shoulders respectively adjacent the ends of the sleeve when the latter is in its upper and lower positions; and a tool for shifting said sleeve and for indicating when the sleeve has been shifted to a desired one of its upper and lower positions including a body, a shifting dog carried by the body and urged outwardly thereof to engage the sleeve and shift it in a direction toward one of its positions upon movement of the body in such direction and disengageable from the sleeve upon movement of the body in an opposite direction, a locator dog carried by the body and having a portion engageable with the conduit shoulder toward which the sleeve is being shifted to limit movement of the body in said opposite direction and thereby indicate the sleeve has not been fully shifted, a cam part carried by the locator dog and disposed to engage the sleeve when the latter has been fully shifted in said one direction to prevent the locator dog from engaging a shoulder whereby the body can move the locator dog past such shoulder in said opposite direction to indicate the sleeve has been fully shifted.

13. The apparatus of claim 12 wherein the shifting and locator dogs are removably mounted on the body and are interchangeable with each other so that with the same tool body, the shifting dog can be carried to shift the sleeve downwardly and the locator dog to engage the lower shoulder when the sleeve is to be shifted down and when the sleeve is to be shifted upwardly, the shifting and locator dogs can be interchanged so that the shifting dog engages the sleeve to move it upwardly and the locator dog can engage the upper shoulder.

14. As a subcombination, a locator tool having a body, a locator dog carried by the body for movement of one end of the dog between extended and retracted position, said dog being biased for movement toward extended position, a notch in the outer face of the dog, the end wall of the notch most remote from said one end of the dog extending substantially normal to the longitudinal axis of the body when the dog is in extended position, said one end of the dog sloping outwardly and toward said end wall to provide a cam surface for engagement with a shiftable sleeve to hold the dog in retracted position.

15. The subcombination of claim 14 wherein the other end wall of said notch slopes outwardly and away from said remote end wall to provide a cam surface for retracting the dog from engagement with a shoulder in a well conduit.

16. As a subcombination, a conduit adapted to be disposed in a well having a pair of spaced annular grooves therein, a sleeve slidable axially between upper and lower positions in the conduit, an annular recess in the sleeve providing upwardly and downwardly facing shoulders intermediate the ends of the sleeve for engagement with a shifting tool to shift the sleeve, one end of the sleeve being split axially to provide a plurality of resilient fingers integral with the sleeve which when in an unflexed condition, providing an outer surface which is a continuation of the sleeve's outer surface and which closely fits with the inner surface of the conduit, said fingers having laterally outwardly extending protuberances at their ends for extending into said grooves when the sleeve is in its upper and lower positions respectively.

17. The subcombination of claim 16 wherein the end walls of the grooves slope inwardly and away from each other and wherein the end walls of the protuberances have a slope complementary to the groove's end walls.

18. In an apparatus including a conduit adapted to be positioned in a well bore, a sleeve-like member in the conduit and shiftable axially between a plurality of positions, an inturned shoulder on the conduit; and a tool for shifting said member and for indicating when such shifting is complete to one of said positions including a body, a shifting dog carried by the body and biased outwardly of the body for engagement with said member to shift it in one direction, a locator dog carried by the body and biased outwardly of the body, said locator dog having a latch portion shaped to engage said shoulder upon outward movement of the locator dog and prevent movement of the tool through the conduit opposite to said one direction while the sleeve is in other than said one position, and a cam surface on said locator dog positioned to be engaged by said sleeve upon its movement to said one position to prevent the locator dog from moving outwardly to engage said shoulder whereby the tool can move through the conduit to signal thereby that the member has been shifted to said one position.

References Cited in the file of this patent

UNITED STATES PATENTS

| | | |
|---|---|---|
| 2,606,616 | Otis | Aug. 12, 1952 |
| 2,901,045 | Schramm | Aug. 25, 1959 |